(12) United States Patent
Patrissi et al.

(10) Patent No.: US 9,340,889 B2
(45) Date of Patent: May 17, 2016

(54) METHOD OF FABRICATING A BIPOLAR ELECTRODE FOR USE IN A SEMI FUEL CELL

(75) Inventors: Charles J. Patrissi, Newport, RI (US); Maria G. Medeiros, Bristol, RI (US); Louis G. Carreiro, Westport, MA (US); Steven P. Tucker, Portsmouth, RI (US); Russell R. Bessette, Mattapoisett, MA (US); Craig M. Deschenes, Somerset, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 1472 days.

(21) Appl. No.: 12/386,184

(22) Filed: Apr. 10, 2009

(65) Prior Publication Data
US 2009/0266716 A1    Oct. 29, 2009

Related U.S. Application Data

(62) Division of application No. 10/923,255, filed on Aug. 11, 2004.

(51) Int. Cl.
| | |
|---|---|
| H01M 4/02 | (2006.01) |
| C25D 3/50 | (2006.01) |
| C25D 5/18 | (2006.01) |
| C25D 5/54 | (2006.01) |
| H01M 4/86 | (2006.01) |
| H01M 4/88 | (2006.01) |
| C23C 28/02 | (2006.01) |

(52) U.S. Cl.
CPC ............... *C25D 3/50* (2013.01); *C23C 28/021* (2013.01); *C23C 28/023* (2013.01); *C25D 5/18* (2013.01); *C25D 5/54* (2013.01); *H01M 4/8631* (2013.01); *H01M 4/8803* (2013.01); *Y02E 60/50* (2013.01)

(58) Field of Classification Search
CPC .............. C25C 3/50; C25C 5/18; C25C 5/54; C22C 28/023; H01M 4/8631
See application file for complete search history.

(56) References Cited

U.S. PATENT DOCUMENTS

| | | | | |
|---|---|---|---|---|
| 3,899,401 | A * | 8/1975 | Nohe et al. | 205/418 |
| 6,740,220 | B1 * | 5/2004 | Medeiros et al. | 205/102 |
| 2004/0265684 | A1 * | 12/2004 | Faris et al. | 429/61 |
| 2006/0286436 | A1 * | 12/2006 | Faghri et al. | 429/44 |
| 2008/0076007 | A1 * | 3/2008 | Zhou et al. | 429/40 |

* cited by examiner

*Primary Examiner* — Mark F Huff
*Assistant Examiner* — Monique Wills
(74) *Attorney, Agent, or Firm* — James M. Kasischke; Jena-Paul A. Nasser

(57) ABSTRACT

A bipolar electrode fabricated with a combination of materials that will physically separate the catholyte from the metal anode of the electrode while providing high electrical conductivity between the metal anode and the catalyst cathode. This is accomplished by layering the catalyst cathode over a composite of conductive adhesive and conductive foil that is then affixed to the metal anode.

4 Claims, 2 Drawing Sheets

METHOD OF FABRICATING A BIPOLAR ELECTRODE FOR USE IN A SEMI FUEL CELL

This application is a divisional of pending prior U.S. patent application Ser. No. 10/923,255 filed on Aug. 11, 2004 and claims the benefit under 35 U.S.C. §121 of the prior application's filing date.

CROSS REFERENCES

This patent application is co-pending with the following two related U.S. patent application Ser. No. 10/923,611 and Ser. No. 10/923,610.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to electrodes and more specifically to a bipolar electrode and its fabrication for use in a separated flow semi-fuel cell.

(2) Description of the Prior Art

Prior art energy sources such as the Zn/AgO electrochemical couple are not suitable for certain applications because of their low energy density. There is a requirement for energy sources with high energy density that are relatively inexpensive, environmentally friendly, safe to operate and reusable, have a long shelf life, are capable of quiet operation and are not prone to spontaneous chemical or electrochemical discharge. In particular, such an energy source would be ideal for long endurance applications as would be required for the propulsion of underwater vehicles such as unmanned underwater vehicles.

Specific types of semi-fuel cells are being developed in an effort to meet the high energy density requirements of unmanned underwater vehicles. To achieve high energy and long endurance, a multicell stack is required. This necessitates the fabrication of bipolar electrodes having a metal anode on one side of the electrode and a catalyst cathode on the other side. In order for a bipolar electrode to function properly, the metal anode side of the bipolar electrode must be electrically connected to the catalyst cathode side. This presents a problem because at the same time the catalyst cathode must be physically isolated from the anolyte, and the metal anode must be physically isolated from the catholyte. There is presently no bipolar electrode designed such that the anode side is electrically connected to the catalyst cathode side and physically separated from the catholyte in a semi-fuel cell. What is needed is the bipolar electrode of the present invention wherein the metal anode is connected to the catalyst cathode through a laminate of conductive adhesive bonded to two sides of a sheet of conductive foil that also physically separates the metal anode from the corrosive catholyte.

SUMMARY OF THE INVENTION

It is a general purpose and object of the present invention to fabricate a bipolar electrode consisting of a metal anode and a catalyst cathode for use in a separated flow semi-fuel cell having a catholyte containing hydrogen peroxide in solution with an acid and an anolyte of seawater.

It is a further object to provide an electrical connection between the catalyst cathode and the metal anode.

Another object is that the electrode be fabricated such that the metal anode of the electrode is protected from the corrosive catholyte.

Still another object is to maintain long term electrode stability in the low pH, oxidizing catholyte.

These objects are accomplished with the present invention through the use of a conductive foil sheet that will act as an electrically conductive physical barrier between the metal anode and the catalyst cathode. The conductive foil will be coated on both sides with a conductive adhesive. On one side of the foil the adhesive will serve as a support for the catalyst cathode. On the opposite side of the foil the adhesive will bond the, catalyst cathode/adhesive/foil composite to the metal anode.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
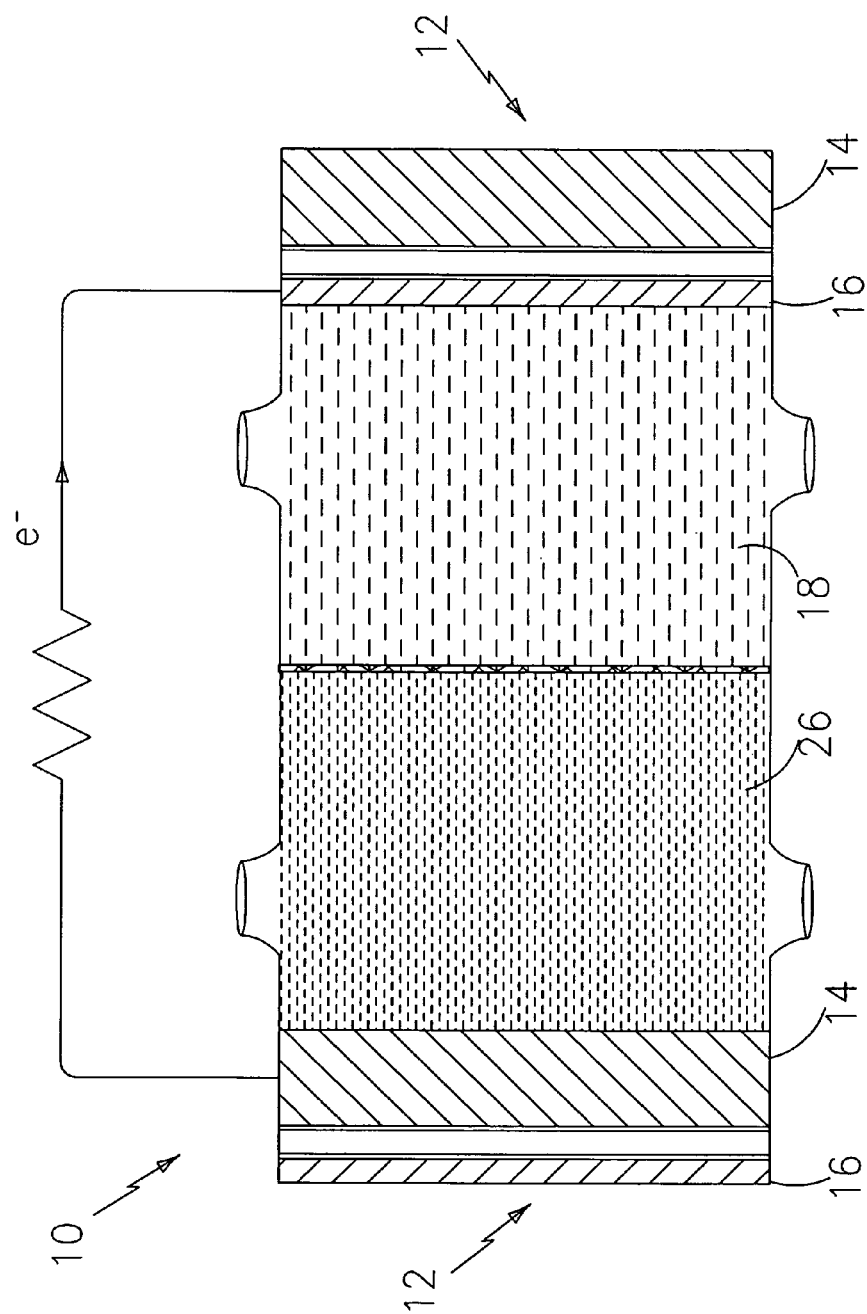
FIG. 1 shows a partial view of a separated flow semi-fuel cell containing bipolar electrodes, anolyte and catholyte.

Referring now to FIG. 1 there is shown part of a separated flow semi-fuel cell 10. Contained within the semi-fuel cell 10 as illustrated are two bipolar electrodes 12 having a metal anode 14 and a catalyst cathode 16. In the preferred embodiment the metal anode 14 is composed of magnesium, however it could also be composed of other metals such as aluminum or lithium or their alloys. The metal anode 14 is in contact with a liquid anolyte 26. In the preferred embodiment the anolyte 26 is composed of but limited to seawater or sodium hydroxide. Also contained in the separated flow semi-fuel cell 10 is a liquid catholyte 18 in contact with catalyst cathode 16. In the preferred embodiment, the catholyte 18 is composed of, but not limited to, hydrogen peroxide and sulfuric acid. In the preferred embodiment, the catalyst used in the catalyst cathode 16 is composed of a palladium iridium alloy, however it is not so limited and could be composed of solely palladium, or iridium, or other suitable metals such as platinum, rhodium, ruthenium, indium, molybdenum, osmium, tungsten, rhenium, cobalt or alloys of the same. The semi-fuel cell 10 requires high electrical conductivity between the metal anode 14 and the palladium iridium catalyst cathode 16 to promote high cell voltage and achieve high energy density. The gap between the bipolar electrodes 12 will ideally be as close together as possible to minimize leakage currents and maximize efficiency of power generation by the semi-fuel cell 10.

Figure 2:
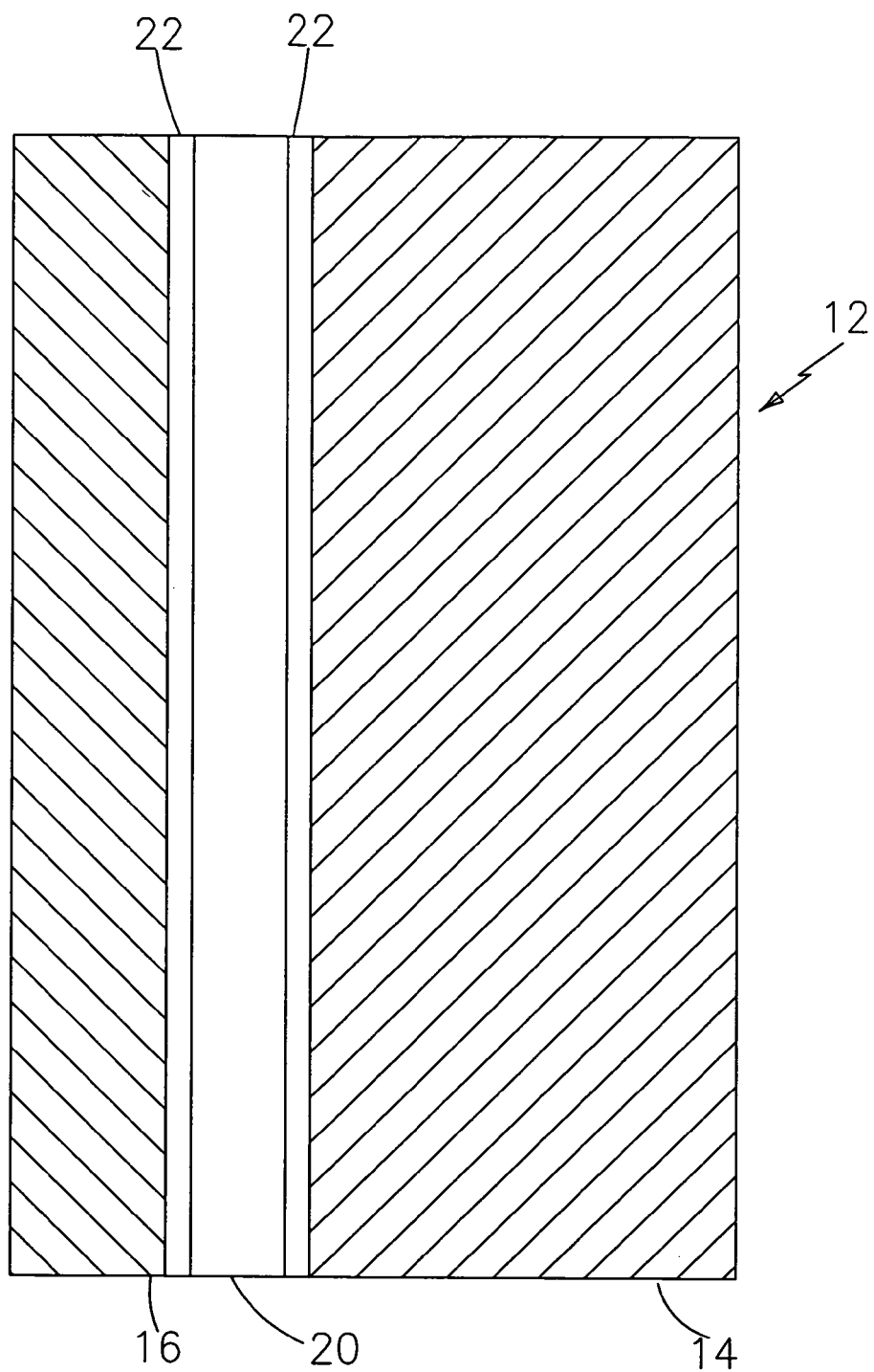
FIG. 2 shows the constituent components of the bipolar electrode.

Referring now to FIG. 2 there is shown the individual constituent components of the bipolar electrode 12. The metal anode 14 is covered by a foil 20 that acts as an electrically conductive barrier between the metal anode 14 and the catalyst cathode 16. In the preferred embodiment the foil 20 is composed of graphite, but may be made of other material such as titanium, gold, silver or nickel, as long as the material has high electrical conductivity, is chemically inert, is not itself subject to corrosion, and is nonporous. It is necessary that the foil 20 exhibit high electrical conductivity to allow the metal anode 14 and the catalyst 16 to be electrically connected as stated above. In order to adhere the foil 20 to the metal anode 14 it is necessary to use an adhesive 22. In the preferred embodiment the adhesive 22 used is a carbon based screen printing ink, but may be made of other material as long as the adhesive 22 has enough cohesive and adhesive strength to maintain the integrity of the bipolar composite electrode 12. In addition, the adhesive 22 must have excellent electronic conductivity, preferably low viscosity and must be stable in the low pH, oxidizing environment of catholyte 14.

A layer of adhesive 22 is also applied to the opposite side of the foil 20 to adhere the catalyst 16 to the foil 20. In this regard, the adhesive 22 will serve two functions. One will be as a support for the palladium iridium catalyst 16 due to the excellent adhesion between the cured screen printing ink and the palladium iridium compound. The other function will be to maintain the stability and performance of the bipolar electrode 12.

The method of fabrication of the bipolar electrode 12 is outlined in the following steps. The first step is to apply a thin coating of the adhesive 22 to the graphite foil 20. In the preferred embodiment, the adhesive 22 is applied to the foil 20 such that there is a thin even coating over the entire surface of the foil 20. The wet thickness of the adhesive 22 is controlled through the use of screen printing techniques known in the art such as placing a piece of mesh that is slightly larger than the foil 20 on top of the wet adhesive 22. The mesh must be uniform in thickness, highly porous so that the adhesive will penetrate it rapidly, and made of a material that will not be affected by the adhesive solvent. In the preferred embodiment a woven polyethylene mesh that is 189 μm thick with a 114 μm mesh opening and a 31% open area is used. A squeegee or similar device is then used to press the mesh onto the surface of foil 20 and scrape off excess adhesive 22. After removing the mesh the adhesive 22 is cured by allowing it to dry at room temperature for approximately 1 to 24 hours and then at elevated temperatures up to 110° C. for approximately 1 to 8 hours in air. The time and temperature ranges are based on the use of a carbon based screen printing ink, but will vary depending on the type of adhesive 22 used.

The next step is to electrochemically deposit the palladium iridium catalyst 16 on the dry adhesive 22. To accomplish this, the adhesive 22 and foil 20 composite is placed on a solid backing. An open frame is clamped down on the adhesive 22 and foil 20 composite to hold the composite in place while at the same time defining a geometric area to expose the adhesive 22 to a plating electrolyte. In the preferred embodiment the electrolyte is composed of but not limited to of 2 mM $PdCl_2$, 2 mM $Na_2IrCl_6 \cdot 6H_2O$, 0.1 M KCl and 0.1 M HCl.

The deposition of the palladium iridium catalyst is carried out using the method as described in U.S. Pat. No. 6,740,220 (2004) to Bessette et al. In the preferred embodiment the method involves but is not limited to employing a cyclic potential sweep between −0.15 and −0.30 Volts, versus an Ag/AgCl reference electrode at 70° C. at 1 mV/s for 25 cycles.

After the catalyst is deposited, the composite of palladium iridium catalyst 16, conductive adhesive 22, and foil 20 must be affixed to the metal anode 14. The metal anode 14 is cleaned to the bare metal with an abrasive. In the preferred embodiment fine grit sandpaper is used. Then the foil 20 is coated with conductive adhesive 22. In the preferred embodiment the foil 20 is coated by hand using a spatula, however other methods such as spraying may be used. A mesh is applied over the wet adhesive 22 and the excess adhesive 22 is removed. The foil 20 is pressed together with the metal anode 14 using approximately 1 to 10 lbs/square inch for a period of approximately 1 to 24 hours. Care should be taken to avoid damaging the palladium iridium alloy during the adhesion process. In the final step of fabrication, the entire bipolar electrode 12 made up of the palladium iridium catalyst cathode 16, adhesive 22, graphite foil 20, and metal anode 14 can then be heated at elevated temperatures approaching 110° C. for approximately 1 to 10 minutes to effect full cure (along with maximum conductivity and adhesive strength) of the adhesive 22.

The present invention provides a novel approach for the fabrication and use of a bipolar electrode. The device provides significant advantages over the prior art.

What has thus been described is a bipolar electrode fabricated with an adhesive and foil composite that is stable in an oxidizing low pH environment, electrically conductive so that polarization losses will not impair semi-fuel cell performance (i.e. reduction in voltage), and non porous so that the metal anode is not corroded by the catholyte.

Obviously many modifications and variations of the present invention may become apparent in light of the above teachings. For example, other conductive barriers aside from graphite such as tin, nickel, gold or silver plated to the metal anode may also be used. The catalyst such as the palladium iridium can then be plated directly onto the tin, nickel, gold or silver surface, which provides high electrical conductivity.

In light of the above, it is therefore understood that within the scope of the appended claims, the invention may be practiced otherwise than as specifically described.

What is claimed is:

1. A method of fabricating a bipolar electrode comprising the steps of:
   applying a thin coating of adhesive to a first surface of foil having two surfaces;
   curing said adhesive by allowing it to dry;
   electrochemically depositing a catalyst on the dry adhesive; and
   affixing the second opposite surface of the foil to a metal anode;
   wherein applying the adhesive comprises:
   disposing the adhesive over the first surface of the foil;
   applying a mesh over the adhesive;
   pressing the mesh onto the first surface of the foil; and
   removing excess adhesive from the mesh.

2. A method of fabricating a bipolar electrode comprising the steps of:
   applying a thin coating of adhesive to a first surface of foil having two surfaces;
   curing said adhesive by allowing it to dry;
   electrochemically depositing a catalyst on the dry adhesive; and
   affixing the second opposite surface of the foil to a metal anode;
   wherein affixing the second opposite surface of the foil to the metal anode comprises:
   cleaning the metal anode to the bare metal with an abrasive;
   coating the second opposite surface of the foil with adhesive;
   pressing the second opposite surface of the foil together with the metal anode;
   curing the adhesive;
   wherein coating the second opposite surface of the foil with adhesive further comprises:
   applying a mesh over the adhesive so that excess adhesive can be scraped off the foil;

pressing the mesh onto the second opposite surface of the foil; and scraping off excess adhesive from the mesh.

3. The method of claim 1 wherein the mesh of a uniform thickness and the mesh is highly porous so that the adhesive will penetrate it rapidly and wherein the mesh will not be affected by an adhesive solvent.

4. The method of claim 3 wherein the mesh is a woven polyethylene material that is 189 micro millimeters thick with a 114 micro millimeter mesh opening.

* * * * *